(12) United States Patent
Shi et al.

(10) Patent No.: US 7,400,758 B2
(45) Date of Patent: Jul. 15, 2008

(54) ABNORMAL PATTERN DETECTING APPARATUS

(75) Inventors: Chao Shi, Kawasaki (JP); Hideya Takeo, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 1088 days.

(21) Appl. No.: 10/748,172

(22) Filed: Dec. 31, 2003

(65) Prior Publication Data

US 2004/0151357 A1 Aug. 5, 2004

(30) Foreign Application Priority Data

Jan. 7, 2003 (JP) .............................. 2003-000922

(51) Int. Cl.
*G06K 9/00* (2006.01)
(52) U.S. Cl. ....................... 382/132; 382/197
(58) Field of Classification Search ................ 382/128, 382/132, 197, 202; 378/37; 128/922
See application file for complete search history.

(56) References Cited

U.S. PATENT DOCUMENTS

| 5,761,334 A | 6/1998 | Nakajima et al. ............ 382/132 |
| 2001/0019623 A1* | 9/2001 | Takeo .......................... 382/128 |
| 2002/0041702 A1* | 4/2002 | Takeo et al. ................. 382/132 |

FOREIGN PATENT DOCUMENTS

JP 2002-133397 A 5/2002

OTHER PUBLICATIONS

Kobatake, Hidefumi "Morphology," K.K. Corona, pp. 161-165, 1996.
Mekada, Yoshihito et al.: "Features of Local Concentration Patterns in Line Figures and Their Applictions," Journal of Society of Electronic Data and Communications J77-DII, pp. 1788-1796, 1994.
Karssemeijer, "Local Orientation Distribution as a Function of Spatial Scale for Detection of Masses in Mammograms," Lect. Notes Comput. Sci., vol. 1613, pp. 280-293, 1999.

* cited by examiner

*Primary Examiner*—Andrew W Johns
(74) *Attorney, Agent, or Firm*—Sughrue Mion, PLLC

(57) ABSTRACT

Diagnostic assistance to physicians is improved, by increasing detection rates of abnormal pattern candidates having radially extending linear structures, and decreasing false positive detection rates. A linear structure extracting means extracts linear structures from within radiation image of a subject. A linear concentration calculating means calculates linear concentrations of the extracted linear structures with respect to each pixel within the image. A directional distribution index calculating means calculates indices of directional distribution of the extracted linear structures with respect to each pixel of interest. A candidate region detecting means calculates products of the linear concentrations and the indices of directional distribution for each pixel of interest, and detects tumor pattern candidate regions based on the calculated products. Thereby, candidate regions are enabled to be extracted while taking into consideration variance in the directions of linear structures.

18 Claims, 5 Drawing Sheets

ABNORMAL PATTERN DETECTING APPARATUS

BACKGROUND OF THE INVENTION

1. Field of the Invention

The present invention relates to an abnormal pattern candidate detecting apparatus. More particularly, the present invention relates to an abnormal pattern candidate detecting apparatus that detects abnormal pattern candidates within an image, based on radiation image data of a subject.

2. Description of the Related Art

In the field of medicine, abnormal pattern candidate detecting processing systems (computer assisted image diagnosis apparatuses) have been proposed in, for example, U.S. Pat. No. 5,761,334. These systems enable objective and automatic detection of abnormal pattern candidates within radiation images of subjects by employing computers, without being affected by the experience or ability of a diagnostician.

These abnormal pattern candidate detecting processing systems detect mainly semispherical core regions as candidates for tumor patterns. The detection is performed based on characteristic density distributions and characteristic shapes of abnormal patterns, by utilizing iris filter processes and the like.

Figure 1:
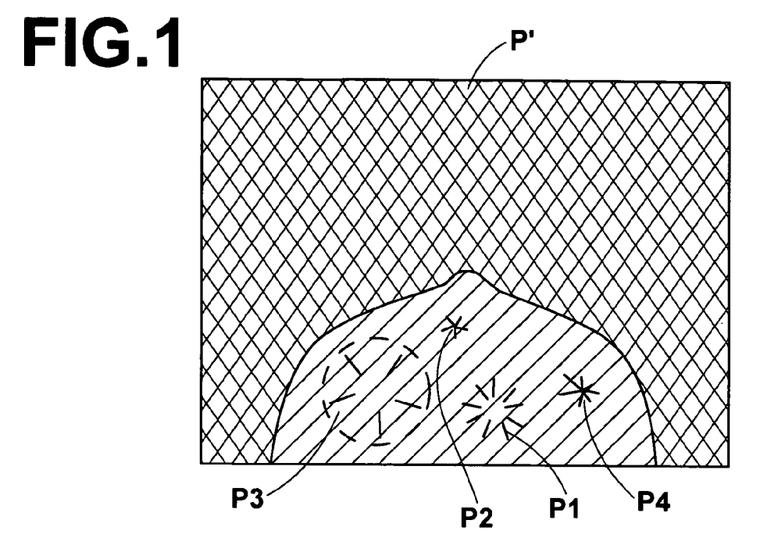
FIG. 1 is a diagram that shows linear structures, which are indicators of tumor patterns within a radiation image of a breast.

Meanwhile, tumor patterns that appear in radiation images are not limited to those in which cores can be visually recognized. For example, there are cases in which only radially extending linear structures called spicula, which exist at the peripheries of cores, can be seen in the images (refer to P1 of FIG. 1). There are cases in which tumors are made up of only spicula, without a core. There are also cases in which cores exist, yet are not pictured in the images. Particularly, as tumors having spicula are considered to have a high possibility of being malignant, it is an important objective to detect tumor patterns having spicula. Also, there is a high possibility that a tumor exists even if a core is not pictured, in portions such as: those in which distributions of breast tissue (mammary glands, blood vessels and the like) deviate from anatomical patterns, and are locally disarranged (referred to as "structural disturbance", refer to Pa of FIG. 1); those in which tissue is locally drawn into one spot (refer to P2 of FIG. 1); and those in which tissue is drawn in over a large region (refer to P3 of FIG. 1).

However, conventional abnormal pattern candidate detecting processing systems employing iris filters detect core regions of tumors that are pictured within images, based on characteristics thereof, such as density distributions. Therefore, it is impossible in principle for these systems to detect tumor patterns, of which the cores cannot be visually recognized within the images, such as those described above.

Therefore, processes employing morphology filters have been proposed in Kobatake, Hidefumi: "Morphology", K. K. Corona, 1996, pp. 161-165, and in Japanese Unexamined Patent Publication No. 2002-133397. The morphology filter processes extract linear structures from within images to detect tumor pattern candidates such as those described above.

Abnormal pattern candidate detecting apparatuses for extracting tumor pattern candidates having linear structures have also been proposed in, for example, Japanese Unexamined Patent Publication No. 2002-133397. In these abnormal pattern candidate detecting apparatuses, the degree of concentration of lines around a specific point is defined as a feature called "linear concentration". Tumor patterns having linear structures are extracted based on the value of the linear concentration.

In addition, methods of extracting tumor pattern candidates having radially distributed linear structures have been proposed in, for example, Mekada, Yoshihito et al.: "Features of Local Concentration Patterns in Line Figures and Their Applications", Journal of the Society of Electronic Data and Communications J77-D-II, 9, 1994, pp.1788-1796. These methods define a uniformity index that quantifies the uniformity of concentration of lines around a specific point. Tumor patterns having radially distributed linear structures are extracted based on the uniformity index. The uniformity index quantifies the uniformity of concentration by utilizing variance in linear concentration within each of a plurality of regions around a pixel of interest, divided into equiangular intervals. The uniformity index is calculated according to the following formula (1).

$$U(M)=1-2\sqrt{\mathrm{var}\{C_{Ri}(M)\}} \qquad (1)$$

wherein:

$U(M)$: uniformity index of a pixel of interest M;

i: a number for identifying each of N regions around the pixel of interest M, divided at equiangular intervals, $i \in [0, N]$;

Ri: each of the regions;

$C_{Ri}(M)$: linear concentration within the N regions; and var: variance of the linear concentration $C_{Ri}(M)$ within the N regions.

Figure 2A:
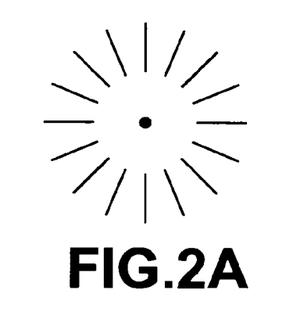
FIG. 2A and FIG. 2B are examples of line shapes which have equal linear concentrations and different directionalities of lines (from Mekada et al.).
Figure 2B:
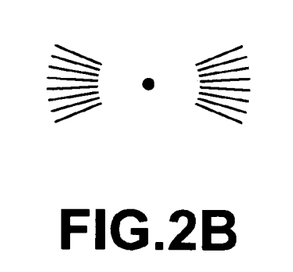

The linear concentration only indicates the degree of concentration of lines around a specific point. Therefore, it is not possible to distinguish between a case in which lines converge from all directions, as shown in FIG. 2A, and a case in which lines converge from specific directions, as shown in FIG. 2B, by using the linear concentration. Accordingly, in the case that a mammogram (a diagnostic radiation image in which a breast is the subject) is the subject of the abnormal pattern candidate detecting apparatus disclosed in Japanese Unexamined Patent Publication No. 2002-133397, not only tumors having radially distributed spicula, but also mammary glands, in which lines are distributed unidirectionally from a point, will be detected. If detection criteria are made strict to avoid false positive detection results, a possibility arises that abnormal patterns made up of spicula will be overlooked.

Figure 3A:
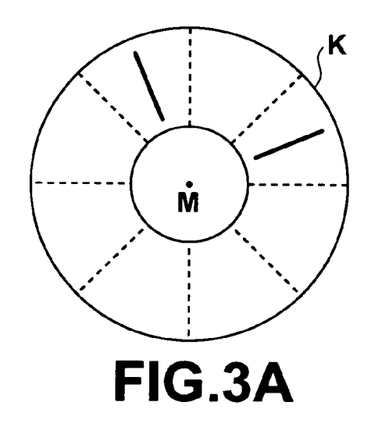
FIG. 3A and FIG. 3B are diagrams that illustrate the symmetry of uniformity indices.
Figure 3B:
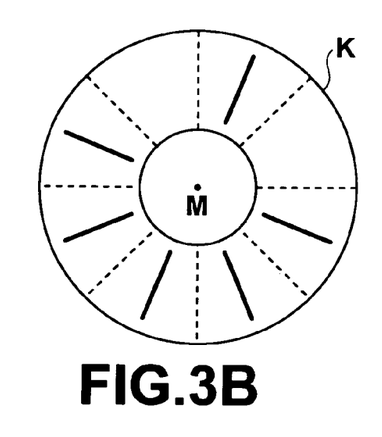

On the other hand, the uniformity index indicates the uniformity of concentration of lines around a specific point toward the specific point. Therefore, it is possible to distinguish the difference among variances in the direction of concentration of lines around a specific point, as in FIG. 2A and FIG. 2B. However, there are cases in which the uniformity index cannot correctly express the variances in direction. This is because the uniformity index assumes its minimum value of 0 when the linear concentration of half of the divided regions is 1 and the linear concentration of the other half of the divided regions is 0, assumes its maximum value of 1 when the linear concentrations of all of the regions are equal, and has symmetric properties. For example, consider a case in which a donut shaped region K around a pixel of interest M is divided into eight regions at equiangular intervals of 45 degrees. In the case that the linear concentrations of two of the eight regions are 1 while the linear concentrations of the rest of the regions are 0, as shown in FIG. 3A, the uniformity index is 0.134. In the case that the linear concentrations of two of the eight regions are 0 while the linear concentrations of the rest of the regions are 1, as shown in FIG. 3B, the uniformity index is 0.134. Therefore, the variances in direction cannot be correctly quantified, regardless of the fact the variance is greater in the example shown in FIG. 3B.

SUMMARY OF THE INVENTION

The present invention has been developed in view of the circumstances described above. It is an object of the present invention to provide an abnormal pattern candidate detecting apparatus with improved the diagnostic assistance function, by increasing the detection efficiency of abnormal pattern candidates having radially extending linear structures, while decreasing false positive detection results.

The first abnormal pattern candidate detecting apparatus according to the present invention comprises:

a linear structure extracting means for extracting a plurality of linear structures having different directionalities within a radiation image, based on image data representing the radiation image, by performing a linear structure extraction process;

a linear concentration calculating means for calculating linear concentrations of the extracted linear structures with respect to each pixel, which is assigned to be a pixel of interest, of the radiation image;

a directional distribution index calculating means for calculating indices of directional distribution of each of the extracted linear structures with respect to each of the pixels of interest; and a candidate region detecting means for detecting candidate regions for tumor patterns within the radiation image, based on calculated evaluation values, obtained based on the linear concentrations and the indices of directional distribution, for each of the pixels of interest.

Here, "linear concentrations of the extracted linear structures with respect to . . . a pixel of interest" refers to the degree of concentration of the extracted linear structures with respect to the pixel of interest. The linear concentration may be, for example, the number of linear structures oriented towards the pixel of interest or a total sum of the components of the linear structures oriented toward the pixel of interest. Alternatively, the linear concentration may be the above values weighted by the reciprocals of the distance of the linear structures from the pixel of interest, or normalized by the total length of the linear structures.

It is desirable that the all of the pixels of the radiation image are assigned to be the "pixel of interest", around which the linear concentrations are calculated. However, only pixels in a portion of the radiation image having a high probability of containing tumor patterns, as determined empirically or through experience, may be assigned to be the pixel of interest.

The "indices of directional distribution of each of the extracted linear structures" are values that quantify variances in directions of the extracted linear structures in the vicinity of the pixel of interest. The distribution of the linear directions expressed in a fashion analogous to information entropy (hereinafter, referred to as "directional entropy") is considered as a specific example.

The "evaluation values, obtained based on the linear concentrations and the indices of directional distribution" are output values obtained when the linear concentrations and the indices of directional distribution are input. Products of the linear concentrations and the indices of directional distribution are considered as specific examples of the evaluation values. Alternatively, the evaluation values may be values which are converted or calculated by, when the linear concentrations and the indices of directional distribution are input to tables and functions, respectively.

The candidate region detecting means may detect a predetermined number of the positions of the pixels of interest having the highest evaluation values as the candidate regions. Alternatively, the positions of pixels of interest having evaluation values higher than a predetermined threshold value may be detected as the candidate regions.

The "positions of the pixels of interest" may be positions of the pixels themselves. However, it is desirable that the positions of the pixels of interest are regions including the vicinities of the pixels.

The second abnormal pattern candidate detecting apparatus according to the present invention comprises:

a core region detecting means for detecting a core region of a tumor pattern within a radiation image, based on image data representing the radiation image, by performing a predetermined detection process;

a linear structure extracting means for extracting a plurality of linear structures having different directionalities within the radiation image, by performing a linear structure extraction process;

a linear concentration calculating means for calculating linear concentrations of the extracted linear structures with respect to each pixel, which is assigned to be a pixel of interest, of the radiation image;

a directional distribution index calculating means for calculating indices of directional distribution of each of the extracted linear structures with respect to each of the pixels of interest; and an evaluating means for evaluating the degree of malignancy of the tumor pattern having the detected core region, based on an evaluation value, which is obtained based on the linear concentration and the indices of directional distribution, for each pixel of interest.

The regions from which the linear structures are extracted may be the entirety of the radiation image. Alternatively, the regions may be limited to the peripheries of the detected core regions, only the outsides of the detected core regions, and the like, according to the characteristics of the linear structures to be detected.

The pixels assigned to be the "pixels of interest", around which the linear concentrations are calculated, may be all of the pixels of the radiation image. Alternatively, only the pixels within the detected core regions may be assigned to be the pixels of interest.

The linear structure extraction process may be a process that employs a morphology filter. Alternatively, a method of extracting linear structures as disclosed in "Extraction of Tumors having Spicula employing Vector Concentration Lines", JAMIT Frontier '98 Lectures pp 104-106. This method extracts linear structures based on the characteristic that the brightness distribution of linear structures within an image assumes a semicircular shape. Therefore, the directional distribution of brightness slope vectors of linear portions is concentrated at the centerlines thereof.

As the "predetermined detection process" may be a process that employs an iris filter.

Note that the abnormal pattern candidate detecting apparatus is particularly effective in the case that the radiation image is a mammogram.

According to the first abnormal pattern candidate detecting apparatus of the present invention constructed as described above, first, the linear structure extracting means extracts linear structures from the radiation image of the subject. Then, the linear concentration calculating means calculates the linear concentrations of the extracted linear structures with respect to each pixel of the radiation image. Next, the directional distribution index calculating means calculates the indices of directional distribution of each of the extracted linear structures with respect to each of the pixels of interest. Thereafter, the candidate region detecting means calculates evaluation values obtained based on the linear concentrations and the indices of directional distribution, for each of the pixels of interest. Finally, the candidate regions for tumor patterns are detected based on the calculated evaluation values. Therefore, it becomes possible to extract candidate regions while taking into consideration the variances in the directions of the linear structures. Accordingly, the detection rate of abnormal pattern candidates having radially extending linear structures is improved,. while false positive detection results are reduced, improving the diagnostic assistance function.

It is often the case that indications of the existence of tumors, such as spicula, drawn in tissue, and structural disturbances, appear in images as linear structures that extend radially from the position of the tumors. Meanwhile, in the case of mammography, for example, linear structures which are distributed unidirectionally from a point, such as mammary glands, also appear in images. According to the first abnormal pattern candidate detecting apparatus of the present invention, the variances of direction of the linear structures are calculated, employing the indices of directional distribution. Then, evaluation values are obtained based on the indices of directional distribution and the linear concentrations. By employing the evaluation values, it becomes possible to discriminate between tumors having radially extending linear structures, such as spicula, and linear structures that are distributed unidirectionally from a point, such as mammary glands.

According to the second abnormal pattern candidate detecting apparatus of the present invention, a core region of a tumor pattern within the radiation image is detected. An evaluation value is obtained based on the linear concentrations and the indices of directional distribution of the linear structures which have been extracted from the image. The evaluating means evaluates the degree of malignancy of the tumor having the detected core region, based on the evaluation value. In this case, whether spicula, which are indicators of malignant tumors, exist around the detected core region, and if they do, to what degree, is determined. At this time, the determination is performed while eliminating linear structures that are distributed from a point, such as mammary glands. Therefore, the detection performance of the abnormal pattern candidate detecting apparatus is improved.

Note that the evaluation value employed by the candidate region detection means and the evaluating means may be a product of the linear concentration and the index of directional distribution. In this case, complicated calculations and conversion tables become unnecessary, and is efficient form the viewpoint of processing performance as well.

DESCRIPTION OF THE PREFERRED EMBODIMENTS

Hereinafter, embodiments of the present invention will be described with reference to the attached drawings.

Figure 4:
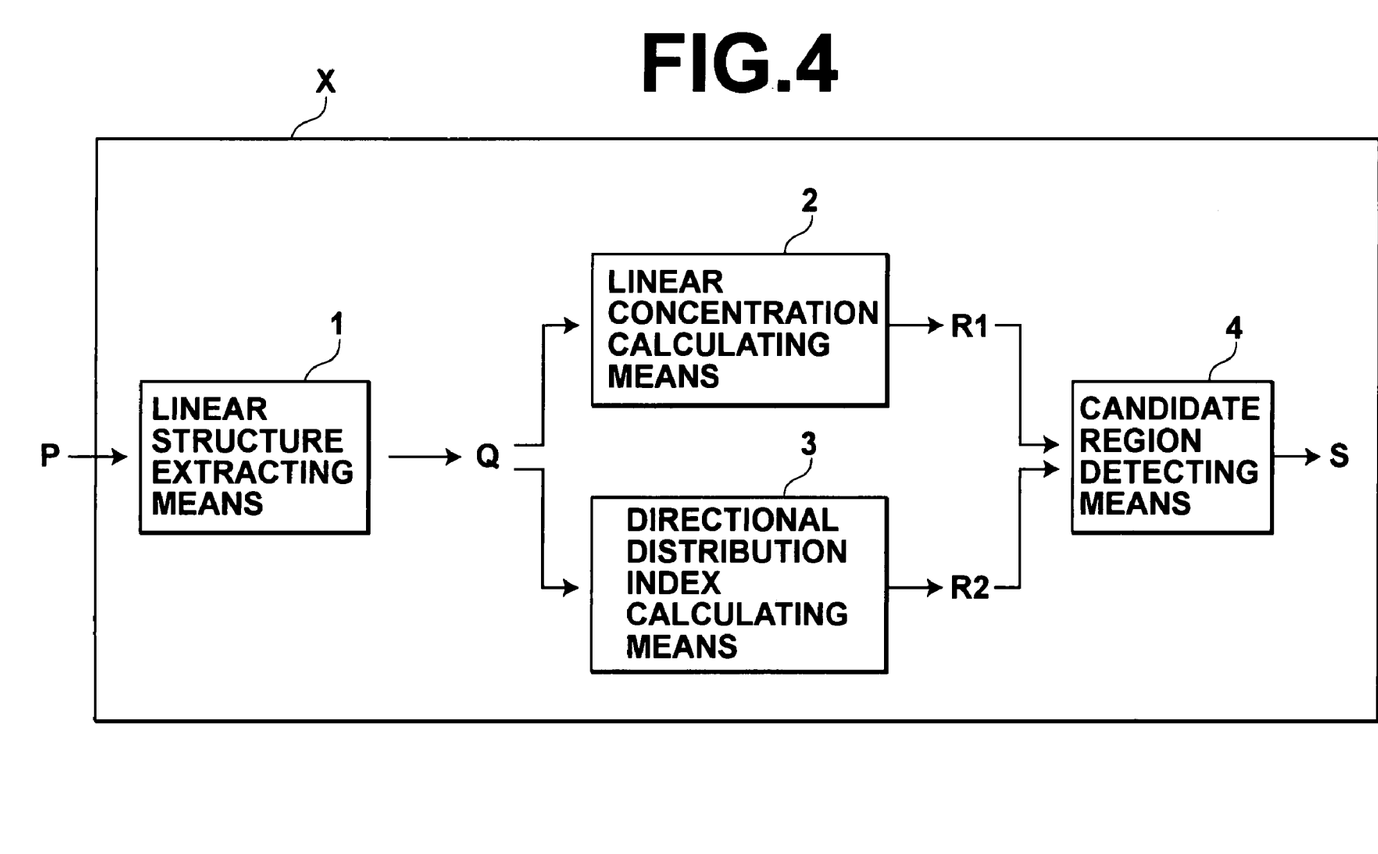
FIG. 4 is a block diagram illustrating the construction of an abnormal pattern candidate detecting apparatus X, according to the first embodiment of the present invention.

An abnormal pattern candidate detecting apparatus X is the first embodiment of the present invention. The apparatus X functions to detect tumor pattern candidates having linear structures, such as spicula. FIG. 4 is a block diagram illustrating the construction of the apparatus X.

As shown in FIG. 4, the apparatus X comprises a linear structure extracting means 1; a linear concentration calculating means 2; a directional distribution index calculating means 3; and a candidate region detecting means 4. The linear structure extracting means 1 extracts linear structures within an image represented by radiation image data P, which is input from an image readout apparatus or the like. The linear concentration calculating means 2 calculates the linear concentrations of the linear structures extracted by the linear structure extracting means 1, with respect to each pixel within the image. The directional distribution index calculating means 3 calculates the indices of directional distribution of the extracted linear structures for each pixel of interest. The candidate region detecting means 4 calculates a product of the linear concentration and the index of directional distribution for each pixel of interest, and detects candidate regions for tumor patterns within the image based on the calculated product.

Next, the operation of the apparatus X will be described.

First, radiation image data P, obtained by imaging a breast, is input to the apparatus X from an image readout apparatus or the like. The linear structure extracting means 1 extracts a plurality of linear structures having different directionalities from the image. In the present embodiment, a morphology filter process, employing a plurality of linear structural elements having different directionalities, extracts the plurality of linear structures. The linear structure extraction is performed as follows. An opening process according to morphology calculation employing a linear structural element, which is smaller than and has the same directionality as a linear structure to be extracted, is administered on the image. By administering the opening process for each linear structural element, a plurality of images of linear structures, for each directionality of the linear structural elements, are obtained. Further, an image of all of the linear structures is obtained by combining the plurality of images. Then, the obtained image of all of the linear structures is binarized by a threshold value process (the process described above is disclosed in Japanese Unexamined Patent Publication No. 2002-133397). Next, a labeling process is administered on the linear structures within the binarized image. Then, a line thinning process is administered, to extract the linear structures as thin lines having widths of one pixel. The image thus obtained is output as thin line linear structure image data Q. Note that the labeling process is a process that recognizes connected pixels within the binarized image, which have been converted to a white color due to having values greater than a threshold value, as a single region. The regions of pixels which have undergone the labeling process are referred to as labels. The line thinning process is a process that reduces the widths of the labeled linear structures to extract one pixel wide centerlines thereof.

Figure 5:
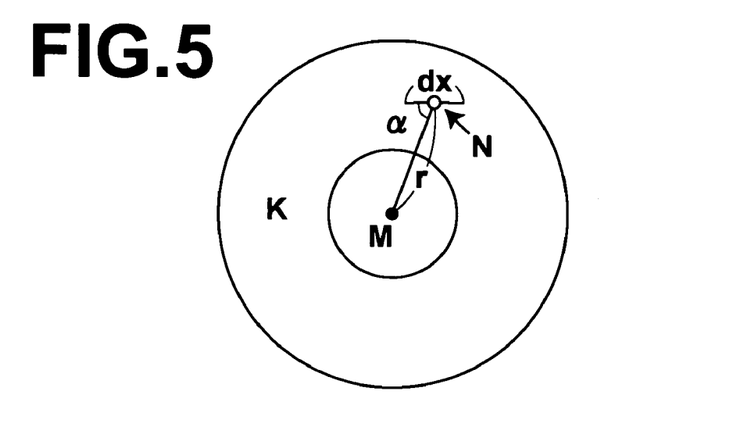
FIG. 5 is a diagram for explaining linear concentration (from Mekada et al.).

The linear concentration calculating means 2 calculates the linear concentrations with respect to each pixel within the image, based on the thin line linear structure image data Q. The linear concentrations, correlated with positional data of each of the pixels, are output as linear concentration data R1. In the present embodiment, the linear concentrations are calculated by employing the method disclosed by Mekada et al. That is, a minimum radius and maximum radius are specified around a pixel of interest M, to set a donut shaped region K having the pixel of interest M at its center, as shown in FIG. 5. Then, points N which constitute linear structures within the region K are located. A total sum of directional components toward the pixel of interest M, of linear elements including the points N (lines in the same directions as those formed by adjacent points within the linear structures and having half the lengths thereof), weighted by the reciprocals of the distances between the points N and the pixel of interest M, is derived. This value is then normalized by the total lengths of the linear elements, weighted by the reciprocals of the distances between the points N and the pixel of interest M. The linear concentrations can be expressed as formula (2).

$$C(M) = \frac{\sum_K \frac{dx|\cos\alpha|}{r}}{\sum_K \frac{dx}{r}} \quad (2)$$

wherein:

C(M): linear concentration with respect to a pixel of interest M;

dx: lengths of linear elements;

$\alpha$: angles formed by the linear elements and the lines MN;

r: distances between the pixel of interest M and points N; and $$\sum_K:$$

total sum within the region K.

The linear concentration assumes its maximum value of 1 in the case that all of the linear elements within the region K are directed toward the pixel of interest M, and the angles $\alpha=0°$. The linear concentration assumes its minimum value of 0 when none of the linear elements within the region K are directed toward the pixel of interest M, that is, when the angles $\alpha=90°$. Note that when no linear elements exist within the region K, the linear concentration assumes a value of 0.

The directional distribution index calculating means 3 calculates indices of directional distribution with respect to each pixel within the image, based on the thin line linear structure image data Q. The indices of direction distribution, correlated with positional data of the pixels, are output as directional distribution index data R2.

Specifically, a minimum radius and maximum radius are specified around a pixel of interest M, to set a donut shaped region K having the pixel of interest M at its center, as shown in FIG. 3. Then, the directional entropy values of the linear structures within the region K are calculated according to the following formula (3).

$$ent = \sum_{i=0}^{7} \frac{Li}{total} \ln \frac{Li}{total}, \quad (3)$$

wherein:

ent: index of directional distribution for a pixel of interest M;

i: a representative number of the inclination of thin lines, in which 180° is divided into eight equiangular sections, the value of i in the section 0° or greater and less than 22.5° is 0, the value of i in the section 22.5° or greater and less than 45° is 1, . . . , and the value of i in the section 157.5° or greater and less than 180° is 7, $i\epsilon[0,7]$;

Li: total length of thin lines having inclination i; and total: total length of the thin lines within the region K.

Figure 6:
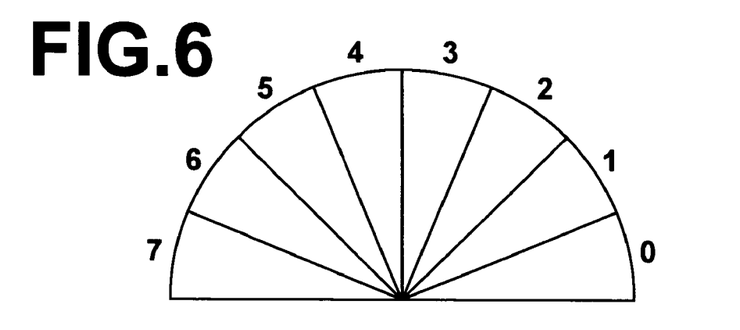
FIG. 6 is a diagram that shows a case in which a 180 degree region is divided into eight equiangular sections, and representative numbers 0 through 7 are assigned to each of the sections, for calculation of indices of directional distribution.
Figure 7:
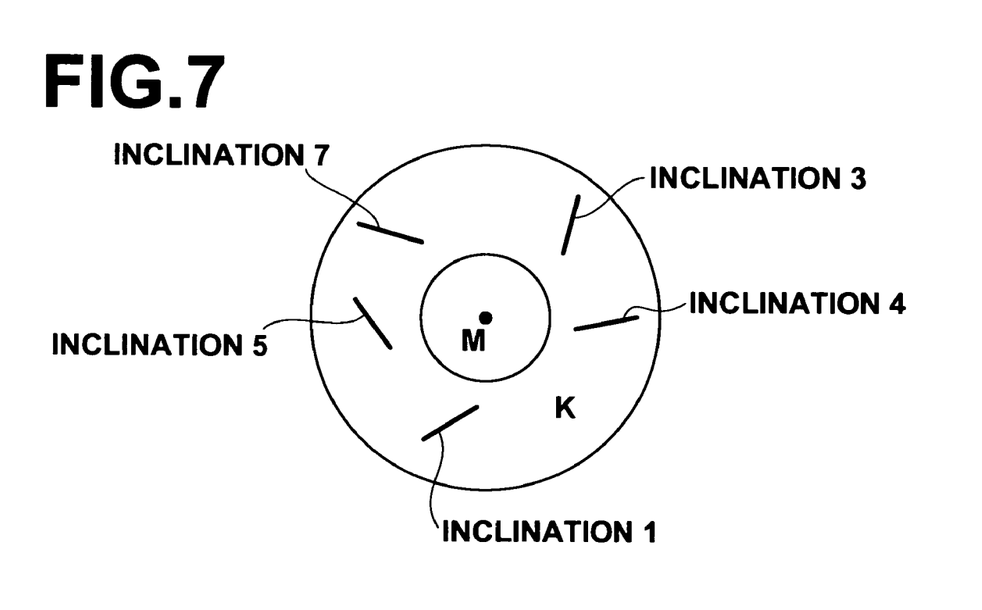
FIG. 7 is an example in which representative numbers have been derived for the inclinations of linear structures within a region K around a pixel of interest M.

Formula (3) applies to a case in which the inclinations of lines are considered within a range of 180°, divided into eight equiangular sections, and representative numbers are assigned to the inclinations. FIG. 6 is a diagram that shows the ranges of the inclinations 0 through 7. FIG. 7 is a diagram that shows the inclinations i for five thin lines within a region K around a pixel of interest M, derived based on FIG. 6. In this case, if the length of each thin line is assumed to be 1, then: L0=0, L1=1, L2=0, L3=1, L4=1, L5=1, L6=0, L7=1, total=5, and the directional distribution index ent≈1.609.

Note that the method for deriving representative numbers for inclinations is not limited to the case in which 180° is divided into eight equiangular sections. The accuracy may be improved by setting the range of inclinations to 360° or increasing the number of sections to 9 or greater, for example.

Here, a comparison will be made between the uniformity index disclosed in Mekada et al. and the directional distribution index of the present invention, with reference to FIG. 3A and FIG. 3B. In FIG. 3A and FIG. 3B, the region K around the pixel of interest M is divided into eight equiangular sections. Therefore, representative numbers for inclinations are assigned as: 0 for 0° or greater and less than 45°, 1 for 45° or greater and less than 90°, . . . , and 7 for 315° or greater and less than 360°. Two thin lines, having inclinations of 0 and 2, exist in FIG. 3A, so if the lengths of each thin line are assumed to be 1, L0=L2=1, Lj=0 (j≠0,2), total=2, and the directional distribution index ent≈0.693. Meanwhile, six thin lines, having inclinations of 1, 3, 4, 5, 6, and 7 exist in FIG. 3B, so the directional distribution index, derived in the same manner is ent≈1.792. In this manner, as the scattering of directionalities of the linear structures in the region is greater, the directional distribution index assumes a larger value. On the other hand, the uniformity index assumes the same value both in the case of FIG. 3A and FIG. 3B, as stated previously. Accordingly, the directional distribution index enables accurate quantification of variance in direction, even in cases in which the uniformity index is incapable of doing so.

Figure 8A:
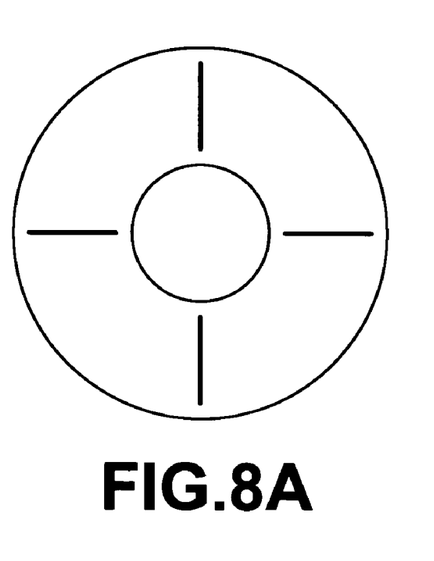
FIG. 8A and FIG. 8B are examples in which indices of directional distribution are equal.
Figure 8B:
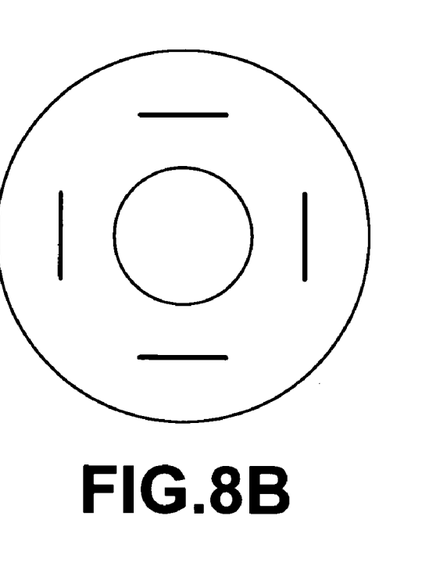

However, the directional distribution index does not take into consideration the degree of concentration of linear structures with respect to a pixel of interest, that is, the linear concentration. Therefore, the directional distribution index assumes the same value in the case that four linear structures having different inclinations are directed toward the pixel of interest as shown in FIG. 8A, and in the case that they surround the pixel of interest as shown in FIG. 8B. Accordingly, it becomes necessary to combine the directional distribution index and the linear concentration for an evaluation.

The linear concentration data R1 and the directional distribution index data R2 are input to the candidate region detecting means 4. The candidate region detecting means 4 calculates products of the linear concentration and the directional distribution index for each pixel of interest. The positions of the pixels of interest within the image are plotted on an x axis and a y axis, and the products are plotted on a z axis. The positions (x, y) of the pixels (for example, two pixels) having the largest products are detected as candidate regions for tumor patterns.

Note that it is desirable that the candidate regions are detected not as points, but as regions.

It is also desirable that conditions are appropriately set during extraction of linear structures and calculation of the linear concentrations, according to the size and the characteristics of the linear structures which are indicators of the tumor patterns to be detected. The directions and sizes of structural elements, the minimum radius and the maximum radius of the donut shaped region, and the use of circular regions as opposed to donut shaped regions, are examples of conditions to be set. For example, in the case that the indicator is a localized area P2 (refer to FIG. 1) where tissue is drawn in, short structural elements, a small donut shaped region, or a small circular region maybe utilized. On the other hand, in the case that the indicator is tissue which is drawn in over a wide region P3 (refer to FIG. 1), comparatively long structural elements and a large donut shaped region may be utilized. Linear structures within an image, which are evidence of tumors, have various characteristic sizes and linear concentrations depending on the type of tumor and its location. Therefore, it is desirable that various conditions such as those described above are appropriately adjusted according to the features of the linear structures within an image. In addition, various linear structures are enabled to be extracted by adjustment. Note that linear structures are more effectively extracted as the number of directions of the structural elements is increased.

In the present embodiment, the linear concentration was calculated with respect to all of the pixels within the image. However, linear concentrations may be calculated with respect to only those pixels in a portion of the radiation image having a high probability of containing tumor patterns, as determined empirically or through experience.

According to the abnormal pattern candidate detecting apparatus X, which is the first embodiment of the present invention, first, the linear structure extracting means 1 extracts linear structures from the radiation image of the subject. Then, the linear concentration calculating means 2 calculates the linear concentrations of the extracted linear structures with respect to each pixel of the radiation image. Next, the directional distribution index calculating means 3 calculates the indices of directional distribution of each of the extracted linear structures with respect to each of the pixels of interest. Thereafter, the candidate region detecting means 4 calculates products of the linear concentrations and the indices of directional distribution, for each of the pixels of interest. Finally, the candidate regions for tumor patterns are detected based on the calculated products. Therefore, it becomes possible to extract candidate regions while taking into consideration the variances in the directions of the linear structures. Accordingly, the detection rate of abnormal pattern candidates having radially extending linear structures is improved, while false positive detection results are reduced, improving the diagnostic assistance function.

It is often the case that indications of the existence of tumors, such as spicula, drawn in tissue, and structural disturbances, appear in images as linear structures that extend radially from the position of the tumors. Meanwhile, in the case of mammography, for example, linear structures which are distributed unidirectionally from a point, such as mammary glands, also appear in images. According to the abnormal pattern candidate detecting apparatus of the present invention, the variances of direction of the linear structures are calculated, employing the indices of directional distribution. Then, products of the indices of directional distribution and the linear concentrations are calculated. By employing the calculated products, it becomes possible to discriminate between tumors having radially extending linear structures, such as spicula, and linear structures that are distributed unidirectionally from a point, such as mammary glands.

Figure 9:
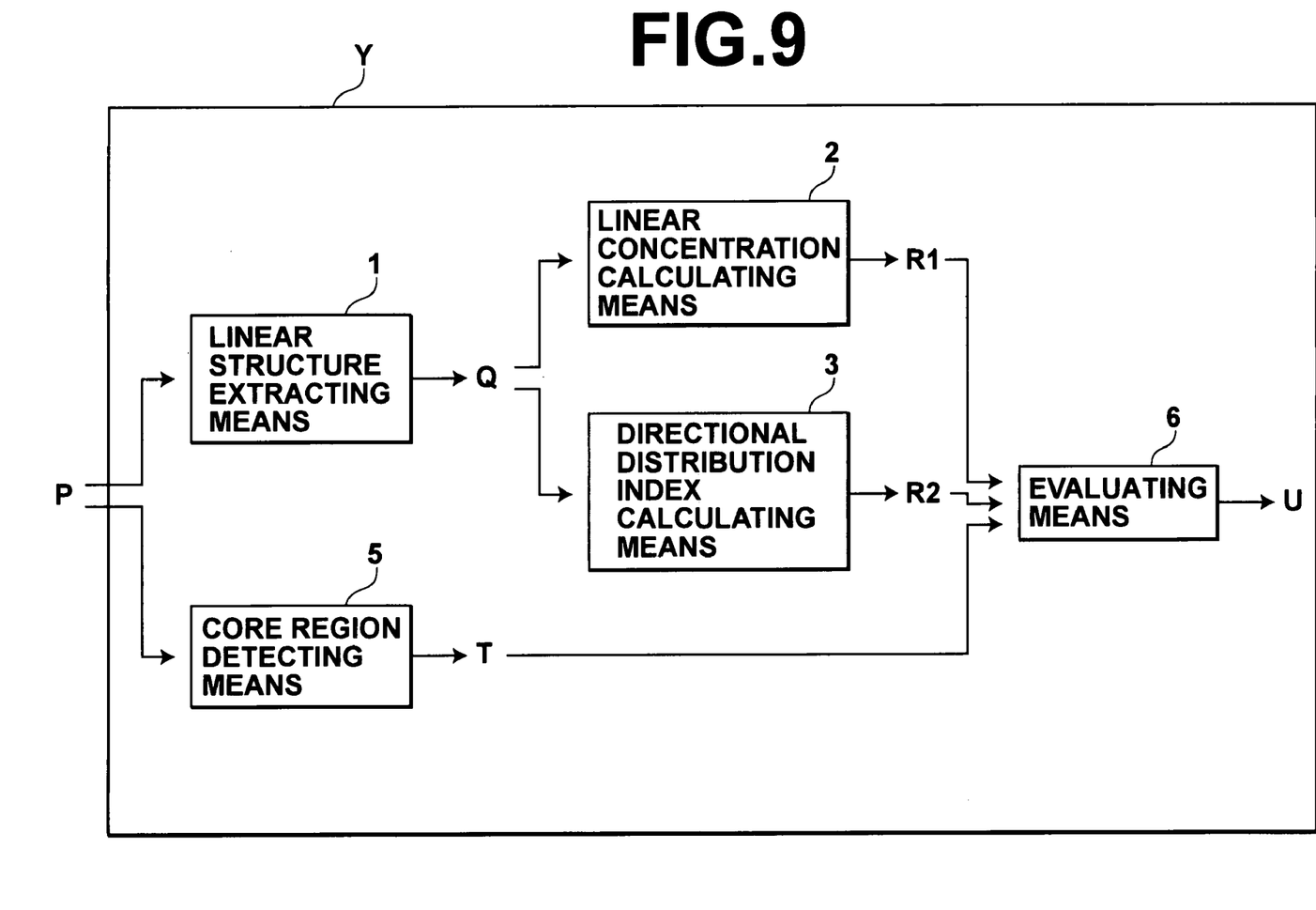
FIG. 9 is a block diagram illustrating the construction of an abnormal pattern candidate detecting apparatus Y, according to the second embodiment of the present invention.

An abnormal pattern candidate detecting apparatus Y is the second embodiment of the present invention, which has a function of detecting core regions and spicula that surround the core regions. FIG. 9 is a block diagram illustrating the construction of the apparatus Y.

As shown in FIG. 9, the apparatus Y comprises a linear structure extracting means 1; a linear concentration calculating means 2; a directional distribution index calculating means 3; a core region detecting means 5; and an evaluating means 6. The linear structure extracting means 1 extracts linear structures within an image represented by radiation image data P, which is input from an image readout apparatus or the like. The linear concentration calculating means 2 calculates the linear concentrations of the linear structures extracted by the linear structure extracting means 1, with respect to each pixel within the image. The directional distribution index calculating means 3 calculates the indices directional distribution of the extracted linear structures for each pixel of interest. The core region detecting means detects core regions within the image, based on the radiation image data P. The evaluating means 6 calculates products of the linear concentrations and the indices of directional distribution for each pixel of interest, and evaluates the malignancy of tumor patterns having the detected core regions based on the calculated products.

Next, the operation of the apparatus Y will be described. Note that descriptions of elements which are equivalent to those of apparatus X will be omitted, insofar as they are not particularly necessary.

The core region detecting means 5 detects core regions within the image based on the radiation image data P, by employing an iris filter process. Then, the core region detecting means 5 outputs the detected core regions, correlated with position data thereof, as core region data T. The details of the iris filter process are described in Mekada et al.

The operations of the linear structure extracting means 1, the linear concentration calculating means 2, and the directional distribution index calculating means 3 are the same as those of apparatus X.

The core region data T, linear concentration data R1, and directional distribution index data R2 are input to the evaluating means 6. The evaluating means 6 calculates products of the linear concentrations and the indices of directional distribution for each pixel of interest. Then, the evaluating means 6 evaluates the malignancy of tumor patterns having the detected core regions, based on the positional data correlated with the linear concentration data R1 and the directional distribution index data R2. There is a high probability that tumors are malignant if they are accompanied by spicula, which are extracted as linear structures. Whether spicula exist at the periphery of the core regions, and to what degree, is determined based on the positional data correlated with each of the input data. Thereby, the degree of malignancy of tumor patterns having the core regions detected by the core region detecting means 5 is evaluated.

Note that in the apparatus Y, all of the linear structures within the image may be extracted, and linear concentrations may be calculated for all of the pixels within the image.

Alternatively, the positional data of the core regions detected by the core region detecting means 5 may be input to the linear structure extracting means 1, the linear concentration calculating means 2, or the directional distribution index calculating means 3. Then, linear structures may be extracted only from areas outside or in the vicinities of the core regions, linear concentrations may be calculated for only pixels within the core regions, based on the positional data thereof. That is, any method may be employed, as long as extraction of spicula that accompany core regions is enabled.

According to the abnormal pattern candidate detecting apparatus Y, which is the second embodiment of the present invention, the core region detecting means 5 detects core regions of a tumor pattern within the radiation image. The evaluating means 6 obtains evaluation values, based on the linear concentrations and the indices of directional distribution of the linear structures which have been extracted from the image. The evaluating means 6 evaluates the degree of malignancy of the tumor having the detected core region, based on the evaluation value. In this case, whether spicula, which are indicators of malignant tumors, exist around the detected core region, and if they do, to what degree, is determined. At this time, the determination is performed while eliminating linear structures that are distributed from a point, such as mammary glands. Therefore, the detection performance of the abnormal pattern candidate detecting apparatus is improved.

Note that the present invention is not limited to detecting abnormal pattern candidates within radiation images of breasts. The present invention may also be utilized in the detection of abnormal pattern candidates within chest X-ray images and the like.

In addition, the products of the linear concentrations and the indices of directional distribution are utilized as the evaluation values in the embodiments described above. However, the evaluation values may be any value obtained by the input of the linear concentrations and the indices of directional distribution. The evaluation values may be calculated by employing functions other than multiplication or by employing conversion tables, for example.

What is claimed is:

1. An abnormal pattern candidate detecting apparatus comprising:
   a linear structure extracting means for extracting a plurality of linear structures having different directionalities within a radiation image, based on image data representing the radiation image, by performing a linear structure extraction process;
   a linear concentration calculating means for calculating linear concentrations of the extracted linear structures with respect to each pixel, which is assigned to be a pixel of interest, of the radiation image;
   a directional distribution index calculating means for calculating indices of directional distribution of each of the extracted linear structures with respect to each of the pixels of interest; and
   a candidate region detecting means for detecting candidate regions for tumor patterns within the radiation image, based on calculated evaluation values, obtained based on the linear concentrations and the indices of directional distribution, for each of the pixels of interest.

2. An abnormal pattern candidate detecting apparatus as defined in claim 1, wherein:
   the candidate region detecting means detects a predetermined number of the positions of the pixels of interest having the highest evaluation values as the candidate regions.

3. An abnormal pattern candidate detecting apparatus as defined in claim 2, wherein:
   the evaluation value is a product of the linear concentration and the index of directional distribution.

4. An abnormal pattern candidate detecting apparatus as defined in claim 3, wherein:
   the indices of directional distribution (ent) are calculated by the following formula $$ent = \sum_{i=0}^{n-1} \frac{Li}{total} \ln \frac{Li}{total},$$

wherein:
   i represents a representative number that represents a category from among n categories (0 to n−1) into which inclinations of the linear structures in the vicinity of the pixel of interest are classified;
   $L_i$ represents a total length of the linear structures in the vicinity of the pixel of interest which are classified into the i category; and
   total represents a total length of all of the linear structures in the vicinity of the pixel of interest.

5. An abnormal pattern candidate detecting apparatus as defined in claim 4, wherein:
   the radiation image is a mammogram; and
   the linear structure extraction process is a process that employs a morphology filter.

6. An abnormal pattern candidate detecting apparatus as defined in claim 5, wherein:
   the linear concentration is derived by:
   calculating the total sum of directional components toward the pixel of interest, of linear elements at points that construct the linear structures in the vicinity of the pixel of interest, weighted by the reciprocals of the distances between the pixel of interest and the points that construct the linear structures; and
   normalizing the total sum thus obtained with a total sum of the lengths of the linear elements, weighted by the reciprocals of the distances between the pixel of interest and the points that construct the linear structures.

7. An abnormal pattern candidate detecting apparatus as defined in claim 3, wherein:
   the radiation image is a mammogram; and
   the linear structure extraction process is a process that employs a morphology filter.

8. An abnormal pattern candidate detecting apparatus as defined in claim 2, wherein:
   the indices of directional distribution (ent) are calculated by the following formula $$ent = \sum_{i=0}^{n-1} \frac{Li}{total} \ln \frac{Li}{total},$$

wherein:
   i represents a representative number that represents a category from among n categories (0 to n−1) into which inclinations of the linear structures in the vicinity of the pixel of interest are classified;
   $L_i$ represents a total length of the linear structures in the vicinity of the pixel of interest which are classified into the i category; and
   total represents a total length of all of the linear structures in the vicinity of the pixel of interest.

9. An abnormal pattern candidate detecting apparatus as defined in claim 1, wherein:
   the evaluation value is a product of the linear concentration and the index of directional distribution.

10. An abnormal pattern candidate detecting apparatus as defined in claim 9, wherein:

the indices of directional distribution (ent) are calculated by the following formula $$ent = \sum_{i=0}^{n-1} \frac{Li}{total} \ln \frac{Li}{total},$$

wherein:

i represents a representative number that represents a category from among n categories (0 to n−1) into which inclinations of the linear structures in the vicinity of the pixel of interest are classified;

$L_i$ represents a total length of the linear structures in the vicinity of the pixel of interest which are classified into the i category; and total represents a total length of all of the linear structures in the vicinity of the pixel of interest.

11. An abnormal pattern candidate detecting apparatus as defined in claim 1, wherein:

the indices of directional distribution (ent) are calculated by the following formula $$ent = \sum_{i=0}^{n-1} \frac{Li}{total} \ln \frac{Li}{total},$$

wherein:

i represents a representative number that represents a category from among n categories (0 to n−1) into which inclinations of the linear structures in the vicinity of the pixel of interest are classified;

$L_i$ represents a total length of the linear structures in the vicinity of the pixel of interest which are classified into the i category; and total represents a total length of all of the linear structures in the vicinity of the pixel of interest.

12. An abnormal pattern candidate detecting apparatus comprising:

a core region detecting means for detecting a core region of a tumor pattern within a radiation image, based on image data representing the radiation image, by performing a predetermined detection process;

a linear structure extracting means for extracting a plurality of linear structures having different directionalities within the radiation image, by performing a linear structure extraction process;

a linear concentration calculating means for calculating linear concentrations of the extracted linear structures with respect to each pixel, which is assigned to be a pixel of interest, of the radiation image;

a directional distribution index calculating means for calculating indices of directional distribution of each of the extracted linear structures with respect to each of the pixels of interest; and an evaluating means for evaluating the degree of malignancy of the tumor pattern having the detected core region, based on an evaluation value, which is obtained based on the linear concentration and the indices of directional distribution, for each pixel of interest.

13. An abnormal pattern candidate detecting apparatus as defined in claim 12, wherein:

the evaluation value is a product of the linear concentration and the index of directional distribution.

14. An abnormal pattern candidate detecting apparatus as defined in claim 13, wherein:

the indices of directional distribution (ent) are calculated by the following formula $$ent = \sum_{i=0}^{n-1} \frac{Li}{total} \ln \frac{Li}{total},$$

wherein:

i represents a representative number that represents a category from among n categories (0 to n−1) into which inclinations of the linear structures in the vicinity of the pixel of interest are classified;

$L_i$ represents a total length of the linear structures in the vicinity of the pixel of interest which are classified into the i category; and total represents a total length of all of the linear structures in the vicinity of the pixel of interest.

15. An abnormal pattern candidate detecting apparatus as defined in claim 14, wherein:

the radiation image is a mammogram;

the detection process is a process that employs an iris filter; and the linear structure extraction process is a process that employs a morphology filter.

16. An abnormal pattern candidate detecting apparatus as defined in claim 15, wherein:

the linear concentration is derived by:

calculating the total sum of directional components toward the pixel of interest, of linear elements at points that construct the linear structures in the vicinity of the pixel of interest, weighted by the reciprocals of the distances between the pixel of interest and the points that construct the linear structures; and normalizing the total sum thus obtained with a total sum of the lengths of the linear elements, weighted by the reciprocals of the distances between the pixel of interest and the points that construct the linear structures.

17. An abnormal pattern candidate detecting apparatus as defined in claim 13, wherein:

the radiation image is a mammogram;

the detection process is a process that employs an iris filter; and the linear structure extraction process is a process that employs a morphology filter.

18. An abnormal pattern candidate detecting apparatus as defined in claim 12, wherein:

the indices of directional distribution (ent) are calculated by the following formula $$ent = \sum_{i=0}^{n-1} \frac{Li}{total} \ln \frac{Li}{total},$$

wherein:

i represents a representative number that represents a category from among n categories (0 to n−1) into which inclinations of the linear structures in the vicinity of the pixel of interest are classified;

$L_i$ represents a total length of the linear structures in the vicinity of the pixel of interest which are classified into the i category; and total represents a total length of all of the linear structures in the vicinity of the pixel of interest.

* * * * *